US012516791B2

(12) United States Patent
Katsuura et al.

(10) Patent No.: US 12,516,791 B2
(45) Date of Patent: Jan. 6, 2026

(54) VEHICLE HEADLIGHT

(71) Applicant: KOITO MANUFACTURING CO., LTD., Tokyo (JP)

(72) Inventors: Yasutaka Katsuura, Shizuoka (JP); Yukio Nomura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/873,970

(22) PCT Filed: Jun. 26, 2023

(86) PCT No.: PCT/JP2023/023656

§ 371 (c)(1),
(2) Date: Dec. 11, 2024

(87) PCT Pub. No.: WO2024/004959

PCT Pub. Date: Jan. 4, 2024

(65) Prior Publication Data

US 2025/0377083 A1 Dec. 11, 2025

(30) Foreign Application Priority Data

Jun. 28, 2022 (JP) ................................ 2022-103917

(51) Int. Cl.
*F21S 45/48* (2018.01)
*F21S 41/32* (2018.01)

(52) U.S. Cl.
CPC ............... *F21S 45/48* (2018.01); *F21S 41/32* (2018.01)

(58) Field of Classification Search
CPC .................................. F21S 41/32; F21S 45/48
(Continued)

(56) References Cited

U.S. PATENT DOCUMENTS

2010/0135037 A1* 6/2010 Tsukamoto ........... F21S 41/147 362/538
2016/0146422 A1* 5/2016 Kuo ........................ F21S 41/50 362/516

(Continued)

FOREIGN PATENT DOCUMENTS

JP 2013-164937 A 8/2013
JP 2018-098105 A 6/2018

(Continued)

OTHER PUBLICATIONS

International Search Report of PCT/JP2023/023656 dated Aug. 15, 2023 [PCT/ISA/210].

*Primary Examiner* — Thomas M Sember
(74) *Attorney, Agent, or Firm* — Sughrue Mion, PLLC

(57) ABSTRACT

A vehicle headlight includes: a second light source having an emission surface of light, the emission surface facing a front side of the second light source; a reflector unit having a second opening configured to allow the emission surface to be exposed therethrough, and a second reflecting portion disposed on a front side of the emission surface and configured to surround the second opening, in which the second reflecting portion reflects the light emitted from the emission surface forwards, and the second reflecting portion has notches provided therein, in which the notches respectively extend in an upward-and-downward direction from both left and right sides of at least one of an upper edge and a lower edge of the second opening and allow a part of the light emitted from the emission surface to pass therethrough.

7 Claims, 8 Drawing Sheets

(58) Field of Classification Search
USPC .................................... 362/516, 296.01, 341
See application file for complete search history.

(56) References Cited

U.S. PATENT DOCUMENTS

| | | | |
|---|---|---|---|
| 2018/0172231 | A1 | 6/2018 | Ugajin et al. |
| 2023/0272898 | A1 | 8/2023 | Mochizuki et al. |

FOREIGN PATENT DOCUMENTS

| | | | |
|---|---|---|---|
| JP | 2020-205207 | A | 12/2020 |
| WO | 2022/009683 | A1 | 1/2022 |

* cited by examiner

VEHICLE HEADLIGHT

CROSS REFERENCE TO RELATED APPLICATIONS

This application is a National Stage of International Application No. PCT/JP2023/023656 filed on Jun. 26, 2023, claiming priority based on Japanese Patent Application No. 2022-103917 filed on Jun. 28, 2022.

TECHNICAL FIELD

The present invention relates to a vehicle headlight.

BACKGROUND ART

A vehicle headlight including a light source and a reflector unit disposed on a front side of the light source and formed to have an opening through which the light source is exposed is known, and Patent Literature 1 below discloses such a vehicle headlight.

In the vehicle headlight disclosed in Patent Literature 1 below, the reflector unit has the opening surrounded by a reflecting portion and configured to expose a low beam light source therethrough, and another opening surrounded by another reflecting portion and configured to expose a high beam light source therethrough. Each of the reflecting portions reflects, in the forward direction, light from the light source exposed from the opening surrounded by each of the reflecting portions. Therefore, in this vehicle headlight, a light distribution pattern of a low beam and a light distribution pattern of a high beam are respectively formed by light emitted from the light source and reflected forwards by the reflecting portion and light emitted from the light source and propagated forwards without being reflected by the reflecting portion.

[Patent Literature 1] WO 2022/009683 A

SUMMARY OF INVENTION

Light emitted from a light source is generally diffused. When the light source is exposed from an opening surrounded by a reflecting portion as in the vehicle headlight of above-described Patent Literature 1, the reflecting portion is located in front of the light source, so that a part of light from the light source may be blocked by the reflecting portion. For this reason, light from the light source may be less likely to be incident on a portion of the reflecting portion below or above the opening outside the opening in the left-and-right direction. When it becomes difficult for light from the light source to be incident on such a portion in the reflecting portion, dark areas may be formed on both left and right sides in a light distribution pattern of light emitted from the vehicle headlight.

Therefore, an object of the present invention is to provide a vehicle headlight capable of suppressing formation of dark areas on both left and right sides in a light distribution pattern.

In order to achieve the above object, a vehicle headlight of the present invention includes: a light source having an emission surface of light, the emission surface facing a front side of the light source; and a reflector unit having an opening and a reflecting portion, the opening allowing the emission surface to be exposed therethrough, the reflecting portion being disposed on a front side of the emission surface and surrounding the opening, in which the reflecting portion reflects the light emitted from the emission surface forwards, and the reflecting portion has notches provided therein, in which the notches respectively extend in an upward-and-downward direction from both left and right sides of at least one of an upper edge and a lower edge of the opening and allow a part of the light emitted from the emission surface to pass therethrough.

In this vehicle headlight, light passing through the notch on the left side can be made incident on a portion located closer to the left side of the reflecting portion than to the opening, and light passing through the notch on the right side can be made incident on a portion located closer to the right side of the reflecting portion than to the opening. Since the notches on the left and right sides extend in the upward-and-downward direction from at least one of the upper edge and the lower edge of the opening, a portion on which light passing through the notches as described above is incident is a side on which the notches are located relative to the opening in the upward-and-downward direction, and is located on at least one of the upper side and the lower side of the opening. Therefore, according to this vehicle headlight, as compared with a case in which the above notches are not provided, it is possible to suppress light from the light source from being less likely to be incident on a portion of the reflecting portion outside the opening in the left-and-right direction and below or above the opening. Therefore, according to this vehicle headlight, it is possible to suppress formation of dark area on both left and right sides in a light distribution pattern of light to be emitted as compared with the above case.

Connecting portions, respectively formed in the notches and each configured to connect an edge on a center side of the opening to an edge of the opening, may be respectively located outside opposite ends of the emission surface in a left-and-right direction.

According to such a configuration, it is possible to suppress both left and right sides of a light distribution pattern of light reflected on the side provided with the notch out of the upper side and the lower side of the opening in the reflecting portion from becoming dark or the width of the light distribution pattern in the left-and-right direction from becoming narrow, as compared with a case in which the above connecting portions are respectively located inside the opposite ends of the emission surface in the left-and-right direction. Therefore, according to this vehicle headlight, it is possible to suppress formation of dark area on both left and right sides in a light distribution pattern of light to be emitted as compared with the above case.

Edges of the respective notches, the edges being located on a side opposite to a center side of the opening, may be connected to respective ends of edges of the opening in a left-and-right direction.

The respective notches may have tip portions each curved so as to approach a center side of the opening in a left-and-right direction.

The above vehicle headlight may further include: a heat sink having a placement surface formed to allow a substrate having the light source mounted thereon to be placed thereon; and a bracket configured to abut on the heat sink from a rear side below the placement surface so as to fix the heat sink thereto. The heat sink may have a screw through hole provided therein and configured to allow a screw to be inserted thereinto, in which the screw may penetrate the heat sink in a forward-and-rearward direction of the heat sink and may fix the heat sink to the bracket, and the heat sink may have an abutting surface allowing the screw to abut thereon, in which the abutting surface may be located behind a plane overlapping the placement surface.

When the vehicle headlight includes the heat sink, the heat sink may have a pin through hole provided below the screw through hole and configured to allow a pin provided on the bracket to be inserted thereinto.

When the vehicle headlight includes the heat sink, the heat sink may have a base plate including the placement surface disposed on a main surface on a front side of the base plate, and the base plate may have inclined portions respectively formed on the upper edges thereof, in which the inclined portions may be linearly inclined downwards toward an outside in the left-and-right direction at opposite end portions of the base plate in the left-and-right direction.

According to this vehicle headlight, the mass of the heat sink can be reduced as compared with a case in which the upper edges of the base plate are formed to have a horizontal linear shape.

As described above, according to the present invention, it is possible to provide a vehicle headlight capable of suppressing formation of dark areas on both left and right sides in a light distribution pattern.

DESCRIPTION OF EMBODIMENTS

Figure 1:
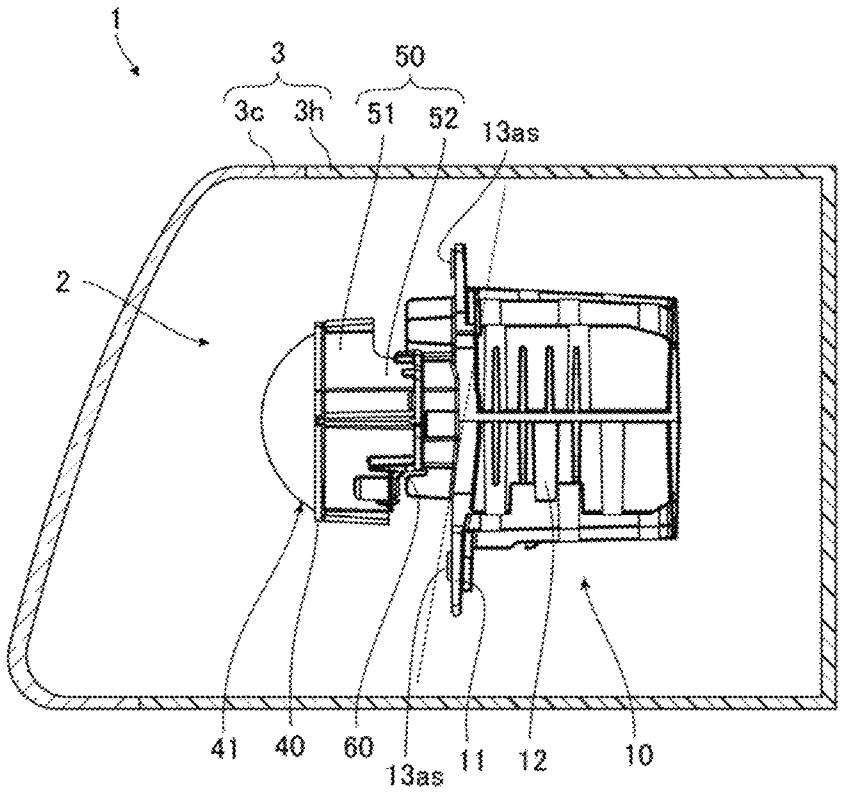
FIG. 1 is a view schematically illustrating a vehicle headlight according to an embodiment of the present invention.

Hereinafter, embodiments for implementing a vehicle headlight according to the present invention will be illustrated together with the accompanying drawings. The embodiments exemplified below are intended to facilitate understanding of the present invention and are not intended to limit the present invention. The present invention can be modified and improved without departing from the gist thereof. In addition, in the present invention, components described in the following exemplary embodiments may be appropriately combined. It is noted that, in the drawings referred to below, dimensions of each member may be changed for easy understanding.

FIG. 1 is a view schematically illustrating a vehicle headlight according to the present embodiment. The vehicle headlight of the present embodiment is provided for an automobile. The vehicle headlight is generally provided in each of the left-and-right directions on the front side of a vehicle. In the present specification, "right" means the right side in the traveling direction of the vehicle, and "left" means the left side in the traveling direction of the vehicle. Each of the left and right vehicle headlights has the same configuration except that the shape is substantially symmetrical in the left-and-right direction. Therefore, one vehicle headlight will be described below.

As illustrated in FIG. 1, a vehicle headlight 1 of the present embodiment includes a bracket (not illustrated) as a main configuration together with a lamp unit 2 and a housing 3. It is noted that, FIG. 1 is a side view of the vehicle headlight 1, and FIG. 1 illustrates the housing 3 in a cross section for easy understanding.

The housing 3 mainly includes a housing 3*h* and a front cover 3*c*. The front cover 3*c* transmits light emitted from the lamp unit 2. The housing 3*h* is formed in a box shape having an opening on the front side thereof, and the front cover 3*c* is fixed to the housing 3*h* so as to close the opening. In this way, a housing space surrounded by the housing 3*h* and the front cover 3*c* is formed in the housing 3, and the lamp unit 2 and the bracket supporting the lamp unit 2 are disposed in the housing space.

Figure 2:
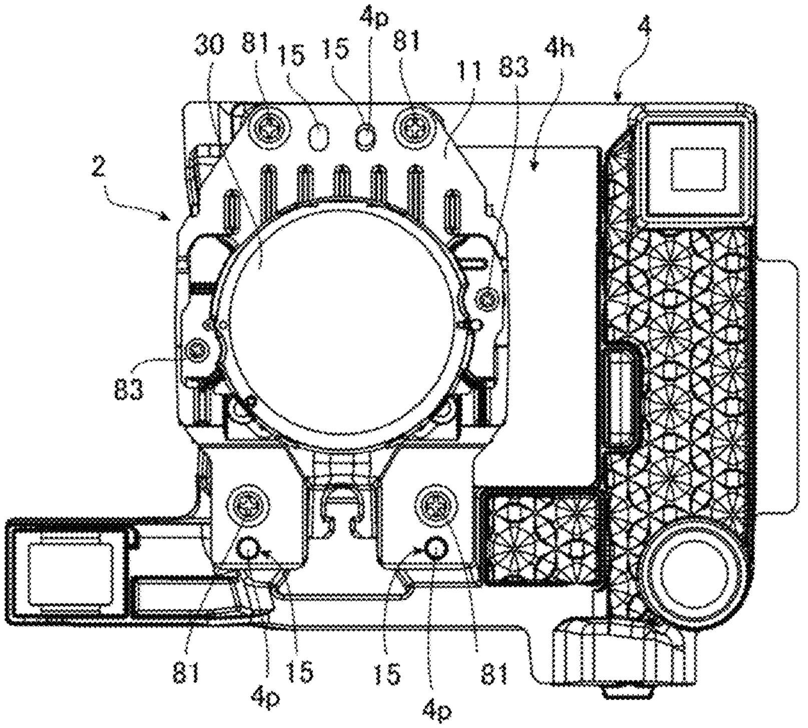
FIG. 2 is a view illustrating a state in which a lamp unit is supported by a bracket.

FIG. 2 is a view illustrating a state in which the lamp unit 2 is supported by the bracket. FIG. 2 is a view illustrating the lamp unit 2 and the bracket as viewed from the front side. As illustrated in FIG. 2, a bracket 4 of the present embodiment is a substantially quadrangular frame-shaped member and has a through hole 4*h*. The lamp unit 2 is fixed to and supported by the bracket 4 in a state in which a part of the lamp unit 2 is located on the front side of the bracket 4. It is noted that fixing of the lamp unit 2 to the bracket 4 will be described later. The bracket 4 is fixed to the housing 3 via a support mechanism (not illustrated). Therefore, the lamp unit 2 is fixed to the housing 3 via the support mechanism and the bracket 4. Examples of a material constituting the bracket 4 include metal.

Figure 3:
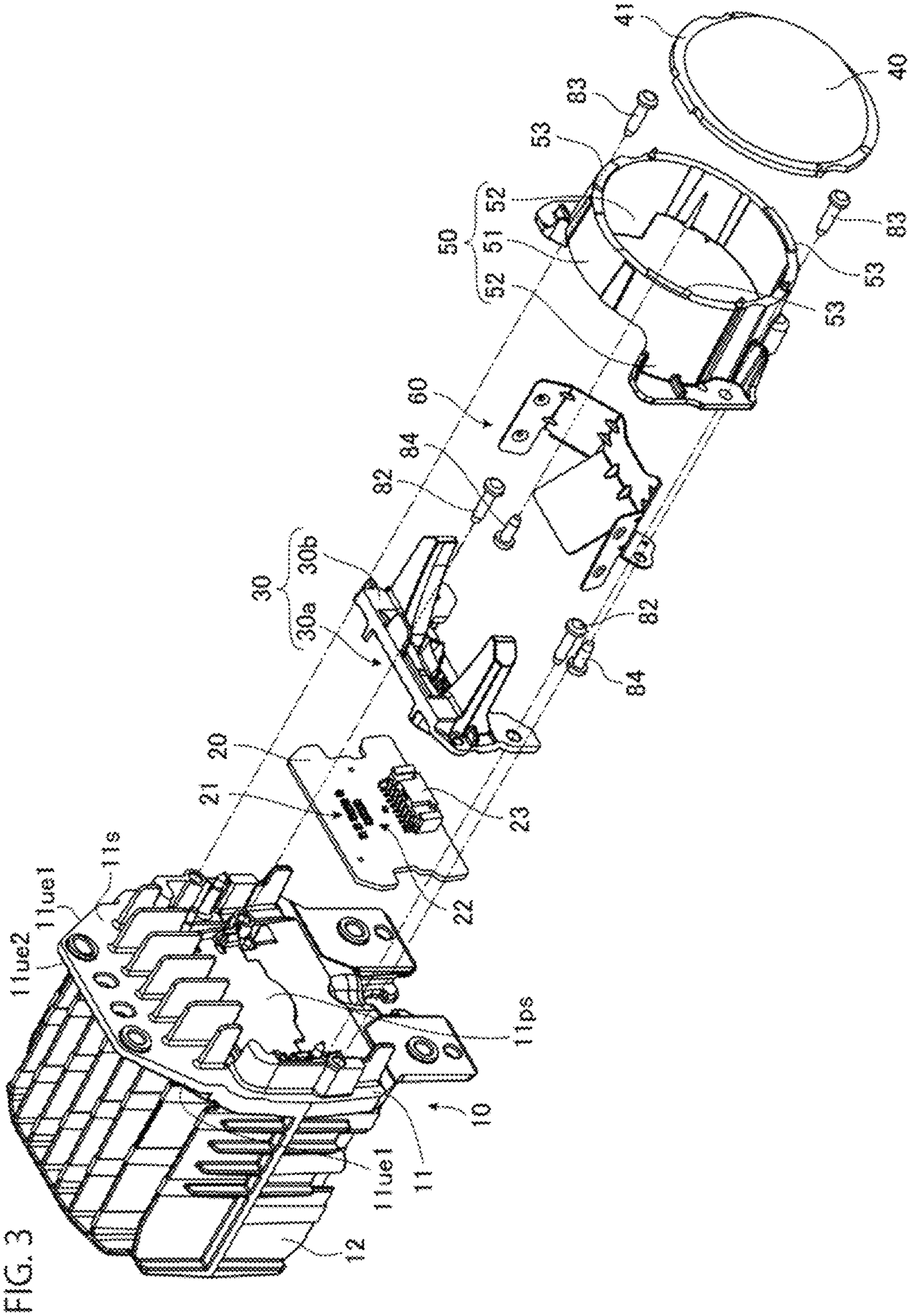
FIG. 3 is an exploded front perspective view of the lamp unit as viewed from diagonally above.

FIG. 3 is an exploded front perspective view of the lamp unit 2 as viewed from diagonally above. As illustrated in FIG. 3, the lamp unit 2 of the present embodiment mainly includes a heat sink 10, a substrate 20, a reflector unit 30, a projection lens 40, a holder 50, and a light shielding plate 60.

Figure 4:
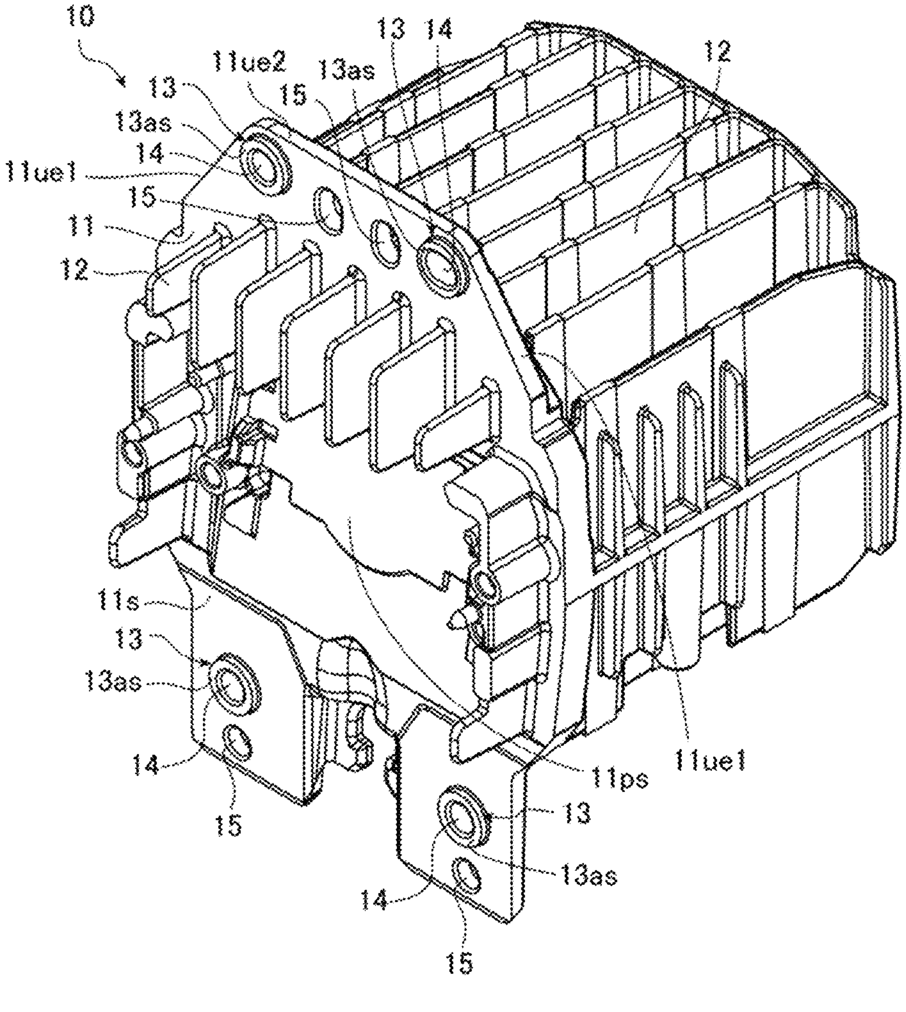
FIG. 4 is a front perspective view of a heat sink as viewed from diagonally above.

FIG. 4 is a front perspective view of the heat sink 10 as viewed from diagonally above. The heat sink 10 is made of a material having excellent heat dissipation, such as metal. As illustrated in FIGS. 3 and 4, the heat sink 10 of the present embodiment mainly includes a base plate 11 on which the substrate 20 is placed, a plurality of heat dissipation fins 12, and a plurality of mounting bosses 13.

The base plate 11 is a plate-shaped member having one main surface 11*s* located on the front side thereof, and the main surface 11*s* includes a placement surface 11*ps* on which the substrate 20 is placed substantially near the center of the placement surface in the upward-and-downward direction. In the present embodiment, the placement surface 11*ps* is a flat surface formed to be inclined rearwards and upwards. In addition, the base plate 11 has inclined portions 11*ue*1 respectively formed on the upper edges thereof and linearly inclined downwards toward the outside in the left-and-right direction at opposite end portions of the base plate in the left-and-right direction, and a portion located between the two inclined portions 11*ue*1 is a central portion 11*ue*2 that is substantially horizontal. Therefore, according to the vehicle headlight 1 of the present embodiment, the mass of the heat sink 10 can be reduced as compared with a case in which the opposite upper edges of the base plate 11 are formed to have a horizontal linear shape. It is noted that the upper edges of the base plate 11 are not particularly limited, and may be formed to have, for example, a substantially horizontal linear shape over the entirety thereof.

The plurality of heat dissipation fins 12 are provided in parallel with above the placement surface 11*ps* on one side of the main surface 11*s* and in parallel with the main surface on the rear side of the base plate 11.

The plurality of mounting bosses 13 are protrusions protruding forwards from one side of the main surface 11*s*. In the present embodiment, the mounting bosses 13 are provided on both left and right sides below the placement surface 11*ps* and on both left and right sides above the placement surface 11*ps*, respectively. A tip surface 13*as* of each of the mounting bosses 13 is a flat surface, and the base plate 11 is formed to have a screw through hole 14 extending from the tip surface 13*as* to a surface on the rear side of the base plate 11 and penetrating the base plate 11 in the forward-and-rearward direction.

The base plate 11 is provided with a pin through hole 15 formed to penetrate the base plate in the forward-and-rearward direction. In the present embodiment, two pin through holes 15 are provided below the two mounting bosses 13 located below the placement surface 11*ps* and are provided between the two mounting bosses 13 located above the placement surface 11*ps*. The two pin through holes 15 located below the two mounting bosses 13 located below the placement surface 11*ps* are respectively located below the two mounting bosses 13 and are each formed to have a substantially circular shape. In addition, the two pin through holes 15 located between the two mounting bosses 13 located above the placement surface 11*ps* are arranged in parallel in the left-and-right direction and are each formed to have an oval track shape substantially elongated in the upward-and-downward direction.

The bracket 4 abuts on a surface on the rear side of the base plate 11 from the rear side, and as illustrated in FIG. 2, pins 4*p* provided on the bracket 4 are respectively inserted into one of the two pin through holes 15 located on the upper side and the two pin through holes 15 located on the lower side from the rear side. Screws 81 are respectively inserted into the four screw through holes 14 from the front side, and the screws 81 are respectively fixed to screw holes (not illustrated) provided in the bracket 4, whereby the heat sink 10 is fixed to the bracket 4. Therefore, the bracket 4 abuts on the base plate 11 of the heat sink 10 from the rear side below and above the placement surface 11*ps*. The tip surface 13*as* of the boss 13 is an abutting surface formed to allow the screw 81 for fixing the heat sink 10 to the bracket 4 to abut thereon. In the present embodiment, the tip surfaces 13*as* of the two mounting bosses 13 located below the placement surface 11*ps* are each located behind a plane overlapping the placement surface 11*ps*, and the tip surfaces 13*as* of the two mounting bosses 13 located above the placement surface 11*ps* are located ahead of this plane. In FIG. 1, this plane is indicated by a broken line. In addition, the position of the tip surface 13*as* in the forward-and-rearward direction relative to this plane is not limited. For example, the tip surfaces 13*as* of the two mounting bosses 13 located below the placement surface 11*ps* may be located ahead of this plane. The numbers, positions, and the like of the screw through holes 14 and the pin through holes 15 are not limited. For example, the mounting boss 13 may be provided only below the placement surface 11*ps*, and the bracket 4 may abut on the heat sink 10 from the rear side below the placement surface 11*ps*. Further, the pin through hole 15 may not be provided in the heat sink 10.

As described above, the substrate 20 is placed on the placement surface 11*ps* of the heat sink 10. In the present embodiment, as illustrated in FIG. 3, a first light source 21, a second light source 22, and a connector 23 are mounted on the surface of the substrate 20 on the side opposite to the heat sink 10 side, and the light emission surfaces of the first light source 21 and the second light source 22 face the front side.

The first light source 21 emits light forming a light distribution pattern of a low beam toward the front side. The second light source 22 emits light forming a light distribution pattern of a high beam together with light emitted from the first light source 21 toward the front side. In the present embodiment, the first light source 21 and the second light source 22 are each an LED array including a plurality of light emitting diodes (LEDs) arranged in the left-and-right direction, and the second light source 22 is located below the first light source 21. The connector 23 is disposed below the second light source 22. A circuit (not illustrated) is provided on the substrate 20, and the connector 23 and the first light source 21, and the connector 23 and the second light source 22 are connected to each other by the circuit. Power is supplied to the connector 23 from a power supply unit (not illustrated). Therefore, power is supplied from the connector 23 to the first light source 21 and the second light source 22. The first light source 21 and the second light source 22 are not limited to the LED array.

Figure 5:
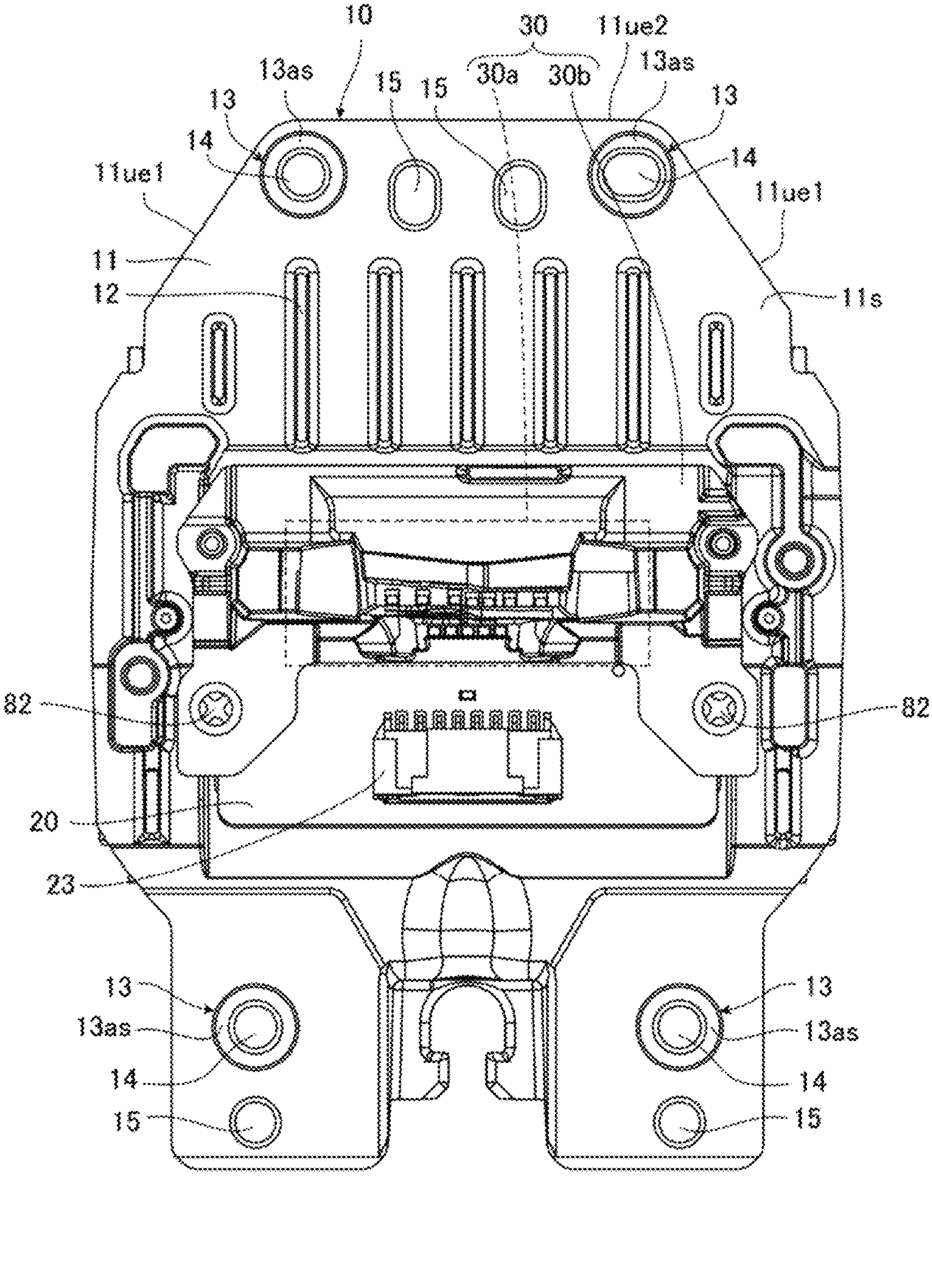
FIG. 5 is a view illustrating a state in which a reflector unit is attached to the heat sink as viewed from the front side.

FIG. 5 is a view illustrating a state in which the reflector unit 30 is attached to the heat sink 10 as viewed from the front side, and is a view as viewed along an optical axis of the projection lens 40 to be described later. As illustrated in FIGS. 3 and 5, the reflector unit 30 is disposed on the front side of the substrate 20, and the substrate 20 is sandwiched between the reflector unit 30 and the heat sink 10. The reflector unit 30 of the present embodiment includes a reflecting portion 30*a* and a cover portion 30*b* connected to both left and right sides and above the reflecting portion 30*a*, and the reflecting portion 30*a* and the cover portion 30*b* are formed to be integrated with each other. In FIG. 5, the reflecting portion 30*a* is surrounded by a broken line. In the present embodiment, the cover portion 30*b* is fixed to the heat sink 10 by a screw 82. As a result, the reflector unit 30 presses the substrate 20 against the heat sink 10, and the substrate 20 is fixed to the heat sink 10. Examples of a material constituting the reflector unit 30 include plated metal, and the reflector unit 30 is formed by performing, for example, a cutting process and plating treatment on a metal member obtained by casting.

Figure 6:
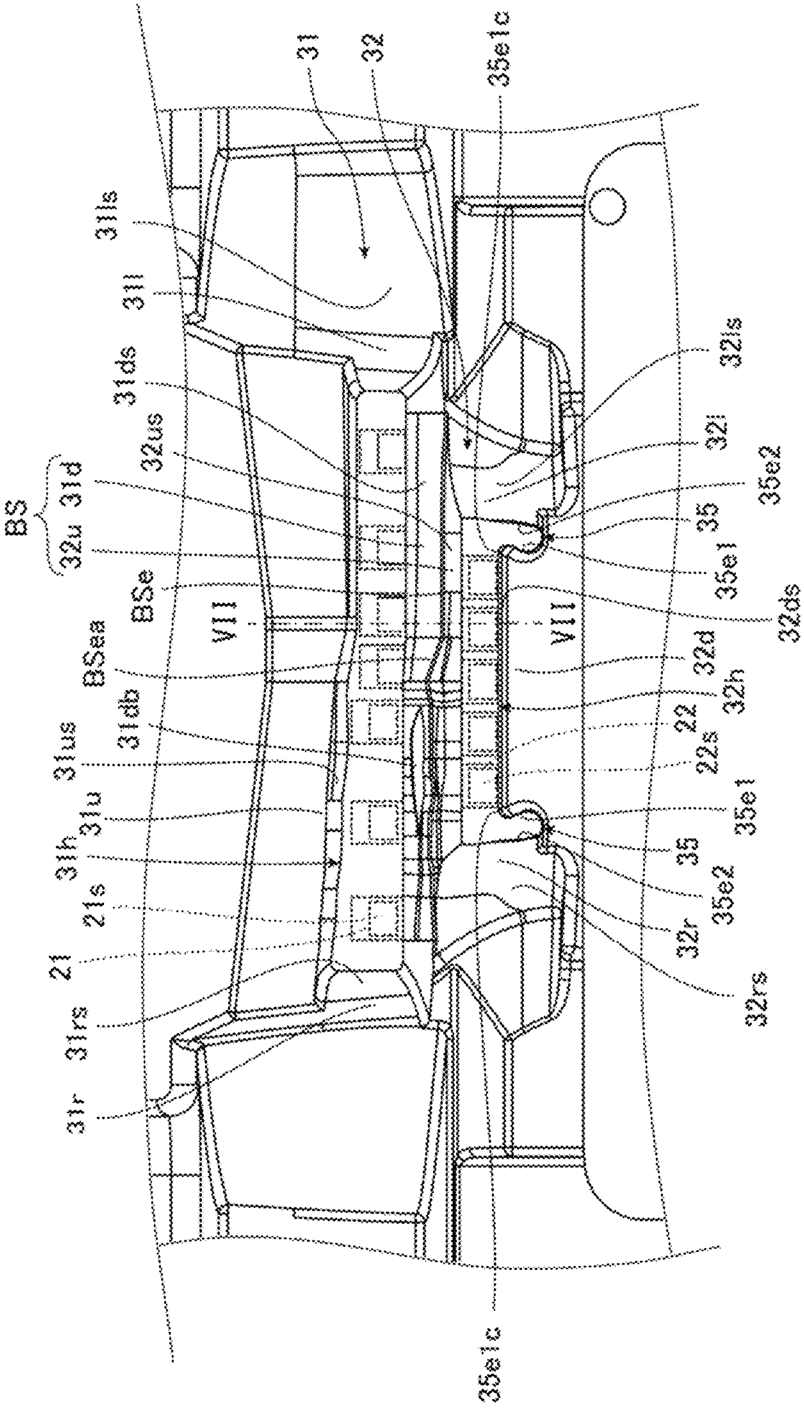
FIG. 6 is an enlarged view illustrating a portion including a reflecting portion in FIG. 5.
Figure 7:
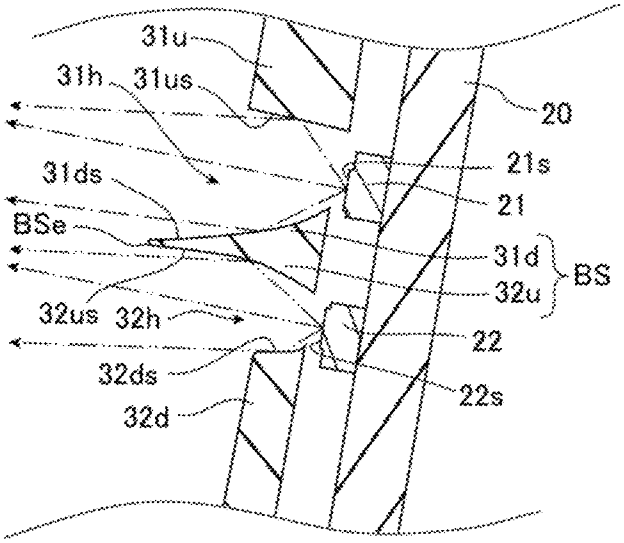
FIG. 7 is a cross-sectional view taken along the line VII-VII in FIG. 6.

FIG. 6 is an enlarged view illustrating a portion including the reflecting portion 30*a* in FIG. 5, and FIG. 7 is a cross-sectional view taken along the line VII-VII in FIG. 6. In FIG. 6, the first light source 21 and the second light source 22 are indicated by broken lines in order to easily view a first opening and a second opening, which will be described later, of the reflector unit 30. In FIG. 7, illustration of the heat sink 10 is omitted, an example of an optical path of light emitted from the first light source 21 is indicated by a one-dot chain line, and an example of an optical path of light emitted from the second light source 22 is indicated by a two-dot chain line. As illustrated in FIGS. 6 and 7, the reflecting portion 30*a* of the present embodiment includes a first reflecting portion 31 and a second reflecting portion 32 located below the first reflecting portion 31.

The first reflecting portion 31 has a first opening 31*h* disposed on the front side of an emission surface 21*s* of the first light source 21 and configured to allow the emission surface 21*s* to be exposed to the front side. Therefore, the first opening 31*h* is surrounded by the first reflecting portion 31. The first reflecting portion 31 reflects light emitted from the emission surface 21*s* to the front side. In the present embodiment, the first opening 31*h* has a horizontally long substantially rectangular shape. Further, the first reflecting portion 31 includes a first upper side reflecting portion 31*u* extending upwards from an upper edge of the first opening 31*h*, a first lower side reflecting portion 31*d* extending downwards from a lower edge of the first opening 31*h*, a first left side reflecting portion 31*l* extending leftwards from a left edge of the first opening 31*h*, and a first right side reflecting portion 31*r* extending rightwards from a right edge of the first opening 31*h*. A lower surface 31*us* of the first upper side reflecting portion 31*u* is the upper edge of the first opening 31*h*, an upper surface 31*ds* of the first lower side reflecting portion 31*d* is the lower edge of the first opening 31*h*, a right side surface 31*ls* of the first left side reflecting portion 31*l* is the left edge of the first opening 31*h*, and a left side surface 31*rs* of the first right side reflecting portion 31*r* is the right edge of the first opening 31*h*.

The second reflecting portion 32 has a second opening 32*h* disposed on the front side of an emission surface 22*s* of the second light source 22 and configured to allow the emission surface 22*s* to be exposed to the front side. Therefore, the second opening 32*h* is surrounded by the second reflecting portion 32. The second reflecting portion 32 reflects light emitted from the emission surface 22*s* to the front side. In the present embodiment, the second opening 32*h* has a horizontally long substantially rectangular shape, and the width of the second opening 32*h* in the left-and-right direction is narrower than the width of the first opening 31*h* in the left-and-right direction. Further, the second reflecting portion 32 includes a second upper side reflecting portion 32*u* extending upwards from an upper edge of the second opening 32*h*, a second lower side reflecting portion 32*d* extending downwards from a lower edge of the second opening 32*h*, a second left side reflecting portion 32*l* extending leftwards from a left edge of the second opening 32*h*, and a second right side reflecting portion 32*r* extending rightwards from a right edge of the second opening 32*h*. A lower surface 32*us* of the second upper side reflecting portion 32*u* is the upper edge of the second opening 32*h*, an upper surface 32*ds* of the second lower side reflecting portion 32*d* is the lower edge of the second opening 32*h*, a right side surface 32*ls* of the second left side reflecting portion 32*l* is the left edge of the second opening 32*h*, and a left side surface 32*rs* of the second right side reflecting portion 32*r* is the right edge of the second opening 32*h*.

In the present embodiment, the second upper side reflecting portion 32*u* is connected to and formed to be integrated with the first lower side reflecting portion 31*d* of the first reflecting portion 31, and a beam shaper BS having a shape tapered toward the front end is formed by the second upper side reflecting portion 32*u* and the first lower side reflecting portion 31*d*. Therefore, the upper surface of the beam shaper BS is the upper surface 31*ds* of the first lower side reflecting portion 31*d*, and the lower surface of the beam shaper BS is the lower surface 32*us* of the second upper side reflecting portion 32*u*. A front end BSe of the beam shaper BS has a shape conforming to a cutoff line in a light distribution pattern of a low beam to be described later, and has an inclined portion BSea inclined upwards from the left side to the right side in a substantially central portion in the left-and-right direction. A protrusion 31*db* protruding upwards is provided on the right side of the inclined portion BSea on the upper surface 31*ds*. Further, the width in the upward-and-downward direction of the first opening 31*h* on the right side of the inclined portion BSea increases from the left side to the right side. It is noted that the protrusion 31*db* may not be provided on the upper surface 31*ds*. The width of the first opening 31*h* in the upward-and-downward direction is not limited, and may be, for example, substantially constant in the left-and-right direction.

The second lower side reflecting portion 32*d* has notches 35 provided therein and formed to respectively extend downwards from both left and right sides of the upper surface 32*ds* of the second lower side reflecting portion 32*d*, which is the lower edge of the second opening 32*h*. Therefore, it can be understood that the second opening 32*h* through which the emission surface 22*s* is exposed includes these notches 35. A part of the light emitted from the emission surface 22*s* passes through each of the notches 35. In the present embodiment, the shapes of the notches 35 respectively disposed on the left and right sides are substantially symmetrical to each other, but the present invention is not limited thereto.

Connecting portions 35*e*1*c*, respectively formed in the notches 35 and each configured to connect an edge 35*e*1 on the center side of the second opening 32*h* to the edge of the second opening 32*h*, are respectively located outside the opposite ends of the emission surface 22*s* of the second light source 22 in the left-and-right direction. In the present embodiment, as described above, since the second light source 22 includes the LED array, the right side end of the emission surface 22*s* of the second light source 22 is the right side end of the emission surface of the LED located on the rightmost side, and the left side end of the emission surface 22*s* of the second light source 22 is the left side end of the emission surface of the LED located on the leftmost side. It is noted that the connecting portions 35*e*1*c* may be respectively located inside the opposite ends of the emission surface 22*s* of the second light source 22 in the left-and-right direction.

Further, an edge 35*e*2 of each of the notches 35 on a side opposite to the center side of the second opening 32*h* is connected to the end of the edge of the second opening 32*h* in the left-and-right direction. The notch 35 on the right side extends along the left side surface 32*rs* of the second right side reflecting portion 32*r*, and the notch 35 on the left side extends along the right side surface 32*ls* of the second left side reflecting portion 32*l*. Therefore, the edge 35*e*2 of the notch 35 on the right side is the left side surface 32*rs* of the second right side reflecting portion 32*r*, and the edge 35*e*2 of the notch 35 on the left side is the right side surface 32*ls* of the second left side reflecting portion 32*l*. The edge 35*e*2 of the notch 35 on the right side from the right side end of the edge of the second opening 32*h* is formed by a curved surface having a substantially constant curvature, and the edge 35*e*2 of the notch 35 on the left side from the left side end of the edge of the second opening 32*h* is formed by a curved surface having a substantially constant curvature. It is noted that the edge 35*e*2 of each notch 35 may be connected to the inside of the edge of the second opening 32*h* from the end in the left-and-right direction. The notch 35 on the right side may not extend along the left side surface 32*rs* of the second right side reflecting portion 32*r*, and the notch 35 on the left side may not extend along the right side surface 32*ls* of the second left side reflecting portion 32*l*. For example, a part of the second lower side reflecting portion 32*d* may be located between the notch 35 on the right side and the second right side reflecting portion 32*r*, and another part of the second lower side reflecting portion 32*d* may be located between the notch 35 on the left side and the second left side reflecting portion 32*l*.

In addition, the lower end portion, which is a tip portion in the extending direction of each of the notches 35, is curved so as to approach the center side of the second opening 32*h* in the left-and-right direction, or the lower end portion may not be curved in this manner. For example, the lower end portion may be curved so as to be away from the center side of the second opening 32*h*.

The projection lens 40 is a lens configured to change a divergence angle of light to be transmitted therethrough, and is disposed in front of the reflector unit 30, as illustrated in FIG. 3. In the present embodiment, the projection lens 40 is a biconvex aspherical lens having a substantially circular outer shape, and a flange portion 41, protruding outwards and extending over the entire circumference thereof, is provided on the outer peripheral surface of the projection lens 40. An optical axis of the projection lens 40 extends in the forward-and-rearward direction, intersects with the beam shaper BS, and passes through a space defined between the first opening 31*h* and the second opening 32*h*. Furthermore, a focal point on the rear side of the projection lens 40 is located in the vicinity of the front end BSe between the front end BSe of the beam shaper BS and the projection lens 40, and the vicinity of the front end BSe is, for example, a position at which a distance to the front end BSe is 10 mm or less. It is noted that the focal point on the rear side of the projection lens 40 may be located on the front end BSe or may overlap the beam shaper BS. Examples of a material constituting the projection lens 40 include resin and glass.

The holder 50 supports the projection lens 40 and is fixed to the heat sink 10. In the present embodiment, the holder 50 includes a cylindrical support portion 51 extending in the forward-and-rearward direction and a pair of foot portions 52 extending rearwards from both left and right sides of the rear end of the support portion 51. A plurality of bases 53 protruding forwards are provided at the front end of the support portion 51, and the flange portion 41 of the projection lens 40 is fixed to the bases 53 by, for example, ultrasonic welding or laser welding. The foot portion 52 is fixed to the heat sink 10 by a screw 83, and the projection lens 40 is fixed to the heat sink 10 via the holder 50. Examples of a material constituting the holder 50 include a resin such as opaque polycarbonate, and in the present embodiment, the support portion 51 and the foot portion 52 are formed to be integrated with each other. It is noted that the configuration of the holder 50 is not limited.

Figure 8:
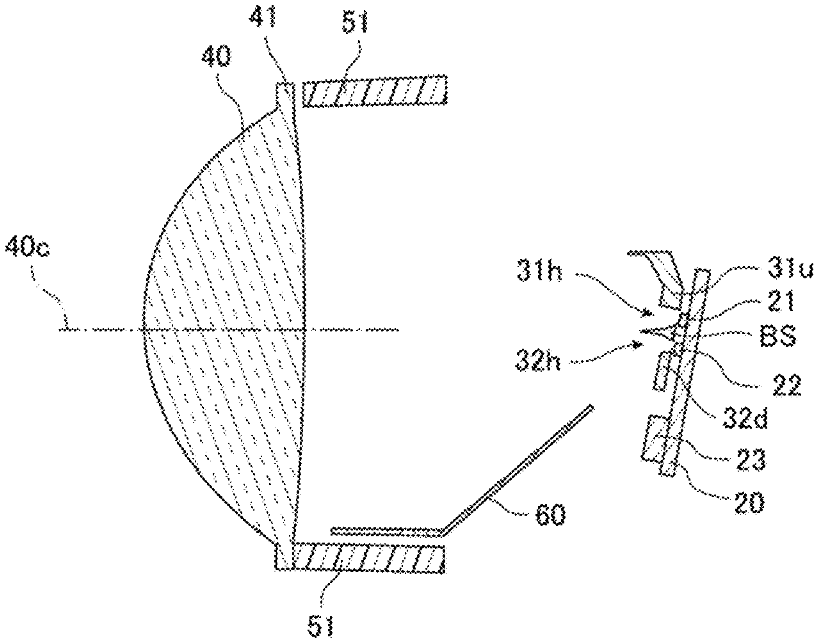
FIG. 8 is a vertical cross-sectional view of the lamp unit.

The light shielding plate 60 is a light non-transmissive plate-like member disposed between the projection lens 40 and the substrate 20 below the reflecting portion 30*a* of the reflector unit 30. In the present embodiment, the light shielding plate 60 is fixed to the holder 50 by a screw 84. FIG. 8 is a vertical cross-sectional view of the lamp unit 2. FIG. 8 is a vertical cross-sectional view taken along an optical axis 40*c* of the projection lens 40, and the heat sink 10 is not illustrated in FIG. 8. As illustrated in FIG. 8, the light shielding plate 60 is disposed between the projection lens 40 and the connector 23 mounted on the substrate 20. In addition, the light shielding plate 60 covers a lower portion of the inner peripheral surface of the support portion 51 of the holder 50. Therefore, the light shielding plate 60 protects the connector 23 and the support portion 51 from sunlight incident from the projection lens 40. As a member constituting the light shielding plate 60, for example, a metal plate can be exemplified. It is noted that the configuration of the light shielding plate 60 is not limited.

Next, a description will be given as to formation of a light distribution pattern of a low beam by the vehicle headlight 1.

When a light distribution pattern of a low beam is formed, light is emitted from the first light source 21. As illustrated in FIG. 7, in the case of light emitted from the emission surface 21*s* of the first light source 21, light emitted in a direction substantially parallel to a perpendicular line of the emission surface 21*s* is directly incident on the projection lens 40 without being reflected by the first reflecting portion 31. Further, light emitted to the front upper side relative to the perpendicular line of the emission surface 21*s* is reflected forwards by the lower surface 31*us* of the first upper side reflecting portion 31*u*, and light emitted to the front lower side relative to the perpendicular line is reflected forwards by the upper surface 31*ds* of the first lower side reflecting portion 31*d*. Although not illustrated herein, light emitted to the front right side is reflected forwards by the left side surface 31*rs* of the first right side reflecting portion 31*r*, and light emitted to the front left side is reflected forwards by the right side surface 31*ls* of the first left side reflecting portion 31*l*. The light reflected by first reflecting portion 31 as described above is incident on the projection lens 40. As described above, since the front end BSe of the beam shaper BS including the first lower side reflecting portion 31*d* of the first reflecting portion 31 and the second upper side reflecting portion 32*u* of the second reflecting portion 32 has a shape conforming to the cutoff line, the cutoff line in the light distribution pattern of the low beam is formed by light passing through the vicinity of the front end BSe of the beam shaper BS. Further, the protrusion 31*db* provided on the upper surface 31*ds* of the first lower side reflecting portion 31*d*, which is the upper surface of the beam shaper BS, reflects and shields a part of light emitted from the emission surface 21*s* so as not to be incident on the projection lens 40. Therefore, a predetermined area in the light distribution pattern of the low beam can be darkened. In this manner, the light distribution pattern of the low beam is formed by the light emitted from the emission surface 21*s* and directly incident on the projection lens 40 and the light emitted from the emission surface 21*s*, reflected by the first reflecting portion 31, and incident on the projection lens 40. The light having the light distribution pattern of the low beam is transmitted through the projection lens 40 and emitted from the vehicle headlight 1 via the front cover 3*c*. As described above, since the focal point on the rear side of the projection lens 40 is located in the vicinity of the front end BSe, the light distribution pattern of the low beam projected in of the vehicle is the light distribution pattern inverted by the projection lens 40.

Figure 9:
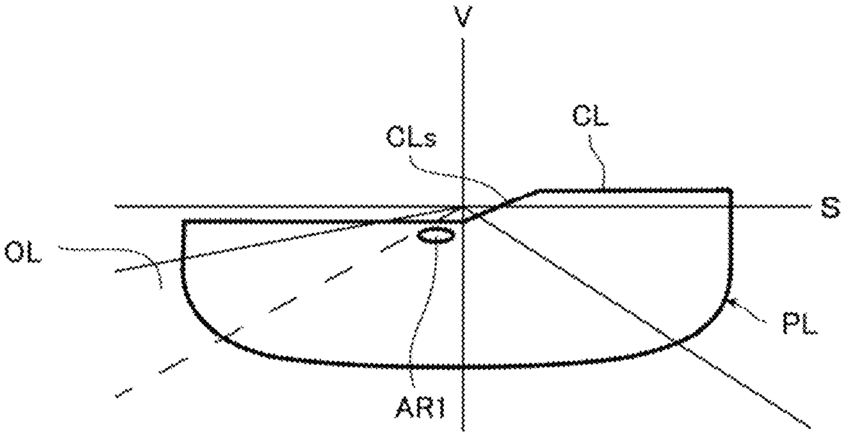
FIG. 9 is a view illustrating a light distribution pattern of a low beam in the present embodiment.

FIG. 9 is a view illustrating the light distribution pattern of the low beam in the present embodiment. In FIG. 9, S represents a horizontal line, V represents a vertical line passing through the center of a vehicle in the left-and-right direction, and a light distribution pattern PL of a low beam projected on a virtual vertical screen arranged 25 m ahead of the vehicle is indicated by a thick line. The light distribution pattern PL of the low beam of the present embodiment is in a country or an area where the vehicle travels on the right side. The first reflecting portion 31 has such a shape that the light distribution pattern of the light incident on the projection lens 40 from the emission surface 21*s* becomes such a light distribution pattern PL of a low beam. A cutoff line CL of the light distribution pattern PL of the low beam corresponds to the shape of the front end BSe of the beam shaper BS, and has a step difference CLs in the present embodiment. In addition, most of the light reflected by the lower surface 31*us* of the first upper side reflecting portion 31*u* is emitted to the lower side in the light distribution pattern PL of the low beam, and most of the light reflected by the upper surface 31*ds* of the first lower side reflecting portion 31*d* is emitted to the upper side in the light distribution pattern PL of the low beam. In addition, most of the light reflected by the left side surface 31*rs* of the first right side reflecting portion 31*r* is emitted to the left side in the light distribution pattern PL of the low beam, and most of the light reflected by the right side surface 31*ls* of the first left side reflecting portion 31*l* is emitted to the right side in the light distribution pattern PL of the low beam. In addition, an area AR1 in the light distribution pattern PL of the low beam is darker than the other areas, and the area AR1 is located closer to an opposite lane OL side than to the step CLs.

Next, a description will be given as to formation of a light distribution pattern of a high beam by the vehicle headlight 1.

When a light distribution pattern of a high beam is formed, light is emitted from the first light source 21 and the second light source 22. Therefore, as described above, the light distribution pattern PL of the low beam is formed by the light from the first light source 21, and light having the light distribution pattern PL of the low beam is emitted from the vehicle headlight 1. As illustrated in FIG. 7, in the case of light emitted from the emission surface 22*s* of the second light source 22, light emitted in a direction substantially parallel to a perpendicular line of the emission surface 22*s* is directly incident on the projection lens 40 without being reflected by the second reflecting portion 32. Further, light emitted to the front upper side relative to the perpendicular line of the emission surface 22*s* is reflected forwards by the lower surface 32*us* of the second upper side reflecting portion 32*u*, and light emitted to the front lower side relative to the perpendicular line is reflected forwards by the upper surface 32*ds* of the second lower side reflecting portion 32*d*. Although not illustrated herein, light emitted to the front right side is reflected forwards by the left side surface 32*rs* of the second right side reflecting portion 32*r*, and light emitted to the front left side is reflected forwards by the right side surface 32*ls* of the second left side reflecting portion 32*l*. As described above, the second lower side reflecting portion 32*d* is provided with the notches 35 extending downwards from both left and right sides of the upper surface 32*ds* which is the lower edge of the second opening 32*h*. Therefore, the light reflected forwards by the left side surface 32*rs* of the second right side reflecting portion 32*r* includes the light passing through the second opening 32*h* and the light passing through the notch 35 on the right side, and the light reflected forwards by the right side surface 32*ls* of the second left side reflecting portion 32*l* includes the light passing through the second opening 32*h* and the light passing through the notch 35 on the left side. In addition, a cutoff line corresponding to the front end BSe is formed in the light distribution pattern formed by the light emitted from the emission surface 22*s* by the light passing through the vicinity of the front end BSe of the beam shaper BS. In this manner, an additional light distribution pattern is formed by the light emitted from the emission surface 22*s* and directly incident on the projection lens 40 and the light emitted from the emission surface 22*s*, reflected by the second reflecting portion 32, and incident on the projection lens 40. This additional light distribution pattern is a light distribution pattern in which the light distribution pattern of the high beam is formed by being added to the light distribution pattern PL of the low beam. Light having this additional light distribution pattern is transmitted through the projection lens 40 and emitted from the vehicle headlight 1 via the front cover 3*c*. Therefore, light having the light distribution pattern of the high beam is emitted from the vehicle headlight 1. The additional light distribution pattern projected in front of the vehicle is a light distribution pattern inverted by the projection lens 40, similarly to the light distribution pattern PL of the low beam. Further, a cutoff line of the additional light distribution pattern is defined by the front end BSe of the beam shaper BS, similarly to the cutoff line CL of the light distribution pattern PL of the low beam. Therefore, the cutoff line of the additional light distribution pattern and the cutoff line CL of the light distribution pattern PL of the low beam substantially coincide with each other, and in the light distribution pattern of the high beam, the additional light distribution pattern and the light distribution pattern PL of the low beam are connected to each other.

In the present embodiment, the upper side of the light distribution pattern PL of the low beam and the lower side of the additional light distribution pattern overlap each other, but the light distribution pattern PL of the low beam and the additional light distribution pattern may not overlap each other. In this case, at least a part of the cutoff line of the additional light distribution pattern coincides with at least a part of the cutoff line CL of the light distribution pattern PL of the low beam, and the additional light distribution pattern and the light distribution pattern PL of the low beam are connected to each other.

Figure 10:
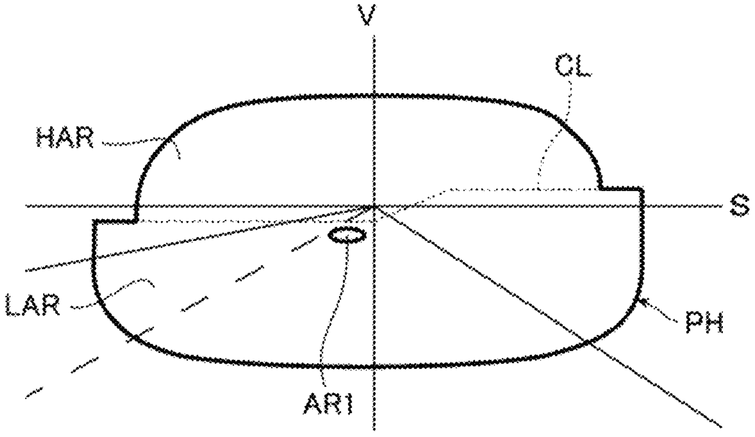
FIG. 10 is a view illustrating a light distribution pattern of a high beam in the present embodiment.

FIG. 10 is a view illustrating a light distribution pattern of a high beam in the present embodiment, and is a view illustrating the light distribution pattern of the high beam, similarly to FIG. 9. In FIG. 10, the cutoff line CL in the light distribution pattern PL of the low beam is indicated by a dotted line. An area LAR below the cutoff line CL in a light distribution pattern PH of a high beam is mainly formed by light from the first light source 21, and an area HAR above the cutoff line CL is mainly formed by light from the second light source 22. In addition, most of the light reflected by the lower surface 32*us* of the second upper side reflecting portion 32*u* of the second reflecting portion 32 is emitted to the lower side in the area HAR above the cutoff line CL, and most of the light reflected by the upper surface 32*ds* of the second lower side reflecting portion 32*d* is emitted to the upper side in the area HAR. In addition, most of the light reflected by the left side surface 32*rs* of the second right side reflecting portion 32*r* is emitted to the left side in the area HAR, and most of the light reflected by the right side surface 32*ls* of the second left side reflecting portion 32*l* is emitted to the right side in the area HAR.

As described above, the vehicle headlight 1 of the present embodiment includes the second light source 22 having the emission surface 22*s* of light facing the front side, and the reflector unit 30. The reflector unit 30 includes the second opening 32*h* through which the emission surface 22*s* of the second light source 22 is exposed, and the second reflecting portion 32 disposed on the front side of the emission surface 22*s* and configured to surround the second opening 32*h*. Further, the second reflecting portion 32 reflects the light emitted from the emission surface 22*s* forwards, and includes the second upper side reflecting portion 32*u* extending upwards from the upper edge of the second opening 32*h*, the second lower side reflecting portion 32*d* extending downwards from the lower edge of the second opening 32*h*, the second left side reflecting portion 32*l* extending leftwards from the left edge of the second opening 32*h*, and the second right side reflecting portion 32*r* extending rightwards from the right edge of the second opening 32*h*. The second lower side reflecting portion 32*d* of the second reflecting portion 32 is provided with the notches 35 respectively formed to extend downwards from both left and right sides of the upper surface 32*ds*, which is the lower edge of the second opening 32*h*, and configured to allow a part of the light emitted from the emission surface 22*s* to pass therethrough. Therefore, according to the vehicle headlight 1 of the present embodiment, light passing through the notch 35 on the left side can be incident on the lower side of the second opening 32*h* in the second left side reflecting portion 32*l*, which is a portion located closer to the left side of the second reflecting portion 32 than to the second opening 32*h* thereof. In addition, according to the vehicle headlight 1 of the present embodiment, light passing through the notch 35 on the right side can be made incident on the lower side of the second opening 32*h* in the second right side reflecting portion 32*r*, which is a portion located closer to the right side of the second reflecting portion 32 than to the second opening 32*h* thereof. Therefore, according to the vehicle headlight 1 of the present embodiment, as compared with a case in which the above notches 35 are not provided, it is possible to suppress light from the second light source 22 from being less likely to be incident on the lower side of the second opening 32*h* in the second left side reflecting portion 32*l* and the second right side reflecting portion 32*r*. Therefore, according to the vehicle headlight 1 of the present embodiment, it is possible to suppress formation of dark areas on both left and right sides in a light distribution pattern of light to be emitted as compared with the above case. Specifically, it is possible to suppress formation of dark areas on both left and right sides of the area HAR above the cutoff line CL in the light distribution pattern PH of the high beam illustrated in FIG. 10.

In the vehicle headlight 1 of the present embodiment, the connecting portions 35*e*1*c*, respectively formed in the notches 35 and each configured to connect the edge on the center side of the second opening 32*h* to the edge of the second opening 32*h*, are respectively located outside the opposite ends of the emission surface 22*s* in the left-and-right direction. Therefore, according to the vehicle headlight 1 of the present embodiment, as compared with a case in which the connecting portions 35*e*1*c* are respectively located inside the opposite ends of the emission surface 22*s* in the left-and-right direction, it is possible to suppress both left and right sides of the light distribution pattern of the light reflected by the second lower side reflecting portion 32*d*, which is the side on which the notches 35 are provided, of the upper side and the lower side of the second opening 32*h* in the second reflecting portion 32 from becoming dark or the width of the light distribution pattern in the left-and-right direction from becoming narrow. Therefore, according to the vehicle headlight 1 of the present embodiment, as compared with the above case, it is possible to suppress formation of dark areas on both left and right sides in the area HAR of the light distribution pattern PH of the high beam illustrated in FIG. 10.

Although the present invention has been described by taking the above-described embodiment as an example, the present invention is not limited thereto.

For example, in the above-described embodiment, a description has been given as an example as to the lamp unit 2 in which a lamp unit that emits light having a light distribution pattern of a low beam and a lamp unit that emits light having an additional light distribution pattern are formed to be integrated with each other. However, the vehicle headlight may have a configuration in which the lamp unit that emits the light having the light distribution pattern of the low beam and the lamp unit that emits the light having the additional light distribution pattern are configured as separate units, and these lamp units are provided. In addition, the light distribution pattern of the light emitted by the lamp unit is not particularly limited.

In addition, in the above-described embodiment, a description has been given as an example as to the reflector unit 30 including the second reflecting portion 32 that includes the second upper side reflecting portion 32*u*, the second lower side reflecting portion 32*d*, the second left side reflecting portion 32*l*, and the second right side reflecting portion 32*r*, and that has the notches 35 provided in the second lower side reflecting portion 32*d*. However, the reflector unit 30 may only have an opening through which an emission surface of light from a light source is exposed, and a reflecting portion disposed on the front side of the emission surface and configured to surround the opening. The reflecting portion may be provided with notches respectively formed to extend in the upward-and-downward direction from both left and right sides of at least one of the upper edge and the lower edge of the opening and configured to allow a part of the light emitted from the emission surface to pass therethrough. According to such a configuration, the light passing through the notch on the left side can be made incident on a portion located closer to the left side of the reflecting portion than to the opening, and the light passing through the notch on the right side can be made incident on a portion located closer to the right side of the reflecting portion than to the opening. Since the notches on the left and right sides extend in the upward-and-downward direction from at least one of the upper edge and the lower edge of the opening, a portion on which light passing through the notches as described above is incident is a side on which the notches are located relative to the opening in the upward-and-downward direction, and is located on at least one of the upper side and the lower side of the opening. Therefore, according to such a configuration, as compared with a case in which the above notches are not provided, it is possible to suppress light from a light source from being less likely to be incident on a portion of a reflecting portion below or above an opening on the outer side of the opening in the left-and-right direction, and it is possible to suppress dark areas from being respectively formed on both left and right sides in a light distribution pattern of light to be emitted. For example, in the second reflecting portion 32 of the above embodiment, the second upper side reflecting portion 32*u*, the second lower side reflecting portion 32*d*, the second left side reflecting portion 32*l*, and the second right side reflecting portion 32*r* may be integrally connected to each other such that boundaries between the above-mentioned reflecting portions are not known. In addition, the first upper side reflecting portion 31*u* of the first reflecting portion 31 of the above embodiment may be provided with notches respectively formed to extend upwards from both left and right sides of the lower surface 31*us* which is the upper edge of the first opening 31*h* and configured to allow a part of the light emitted from the emission surface 21*s* of the first light source 21 to pass therethrough. In addition, when a lamp unit that emits light having a light distribution pattern of a low beam and a lamp unit that emits light having an additional light distribution pattern are configured as separate bodies, notches, respectively formed to extend in the upward-and-downward direction from both left and right sides of both the upper edge and the lower edge of an opening through which an emission surface of a light source is exposed and configured to allow a part of the light emitted from the emission surface to pass therethrough, may be provided.

According to the present invention, a vehicle headlight capable of suppressing formation of dark areas on both left and right sides in a light distribution pattern is provided, and the vehicle headlight can be used in the field of vehicle headlights for automobiles and the like.

The invention claimed is:

1. A vehicle headlight comprising:

a light source having an emission surface of light, the emission surface facing a front side of the light source; and a reflector unit having an opening and a reflecting portion, the opening allowing the emission surface to be exposed therethrough, the reflecting portion being disposed on a front side of the emission surface and surrounding the opening, wherein:

the reflecting portion reflects the light emitted from the emission surface forwards, and the reflecting portion has notches provided therein, wherein the notches respectively extend in an upward-and-downward direction from both left and right sides of at least one of an upper edge and a lower edge of the opening and allow a part of the light emitted from the emission surface to pass therethrough.

2. The vehicle headlight according to claim 1, wherein connecting portions, respectively formed in the notches and each configured to connect an edge on a center side of the opening to an edge of the opening, are respectively located outside opposite ends of the emission surface in a left-and-right direction.

3. The vehicle headlight according to claim 1, wherein edges of the respective notches, the edges being located on a side opposite to a center side of the opening, are connected to respective ends of edges of the opening in a left-and-right direction.

4. The vehicle headlight according to claim 1, wherein the respective notches have tip portions each curved so as to approach a center side of the opening in a left-and-right direction.

5. The vehicle headlight according to claim 1, further comprising:

a heat sink having a placement surface formed to allow a substrate having the light source mounted thereon to be placed thereon; and a bracket configured to abut on the heat sink from a rear side below the placement surface so as to fix the heat sink thereto, wherein:

the heat sink has a screw through hole provided therein and configured to allow a screw to be inserted thereinto, wherein the screw penetrates the heat sink in a forward-and-rearward direction of the heat sink and fixes the heat sink to the bracket, and the heat sink has an abutting surface allowing the screw to abut thereon, wherein the abutting surface is located behind a plane overlapping the placement surface.

6. The vehicle headlight according to claim 5, wherein the heat sink has a pin through hole provided below the screw through hole and configured to allow a pin provided on the bracket to be inserted thereinto.

7. The vehicle headlight according to claim 6, wherein:

the heat sink has a base plate including the placement surface disposed on a main surface on a front side of the base plate, and the base plate has inclined portions respectively formed on the upper edges thereof, wherein the inclined portions are linearly inclined downwards toward an outside in the left-and-right direction at opposite end portions of the base plate in the left-and-right direction.

* * * * *